(12) United States Patent
Huang et al.

(10) Patent No.: US 10,205,170 B1
(45) Date of Patent: Feb. 12, 2019

(54) COPPER FOIL FOR CURRENT COLLECTOR OF LITHIUM SECONDARY BATTERY

(71) Applicant: CHANG CHUN PETROCHEMICAL CO., LTD., Taipei (TW)

(72) Inventors: Huei-Fang Huang, Taipei (TW); Kuei-Sen Cheng, Taipei (TW); Yao-Sheng Lai, Taipei (TW); Jui-Chang Chou, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 15/782,494

(22) Filed: Dec. 4, 2017

(51) Int. Cl.
- *H01M 4/66* (2006.01)
- *C25D 7/06* (2006.01)
- *H01M 10/052* (2010.01)
- *H01M 4/04* (2006.01)
- *H01M 4/38* (2006.01)
- *H01M 4/02* (2006.01)

(52) U.S. Cl.
CPC .......... *H01M 4/661* (2013.01); *C25D 7/0614* (2013.01); *C25D 7/0642* (2013.01); *H01M 4/045* (2013.01); *H01M 4/38* (2013.01); *H01M 10/052* (2013.01); *H01M 2004/027* (2013.01); *H01M 2220/20* (2013.01)

(58) Field of Classification Search
None
See application file for complete search history.

(56) References Cited

U.S. PATENT DOCUMENTS

| 8,114,543 B2 | 2/2012 | Sano et al. | |
| 2007/0134556 A1* | 6/2007 | Sano | H01M 2/16 429/247 |
| 2013/0108922 A1* | 5/2013 | Shinozaki | H01M 4/13 429/211 |
| 2013/0266871 A1* | 10/2013 | Berger | H01M 4/661 429/233 |
| 2014/0199588 A1 | 7/2014 | Shinozaki et al. | |
| 2017/0115074 A1 | 4/2017 | Cheng | |

FOREIGN PATENT DOCUMENTS

| EP | 0649917 A1 | 4/1995 |
| EP | 3121885 A1 | 1/2017 |
| JP | 5981165 B2 | 8/2016 |

OTHER PUBLICATIONS

European Office Action for Application No. EP 18 199 805.5, dated Nov. 28, 2018, 4 pages.
European Search Report for Application No. EP 18 19 9805, dated Nov. 19, 2018, 3 pages.

* cited by examiner

*Primary Examiner* — Ula C Ruddock
*Assistant Examiner* — Tony S Chuo
(74) *Attorney, Agent, or Firm* — Nixon Peabody LLP; Thomas P. Pavelko

(57) ABSTRACT

Electrodeposited copper foils having adequate puncture strength to withstand both pressure application during consolidation with negative electrode active materials during manufacture, as well as expansion/contraction during repeated charge/discharging cycles when used in a rechargeable secondary battery are described. These copper foils find specific utility as current collectors in rechargeable secondary batteries, particularly in lithium secondary battery with high capacity. Methods of making the copper foils, methods of producing negative electrode for use in lithium secondary battery and lithium secondary battery of high capacity are also described.

6 Claims, 3 Drawing Sheets

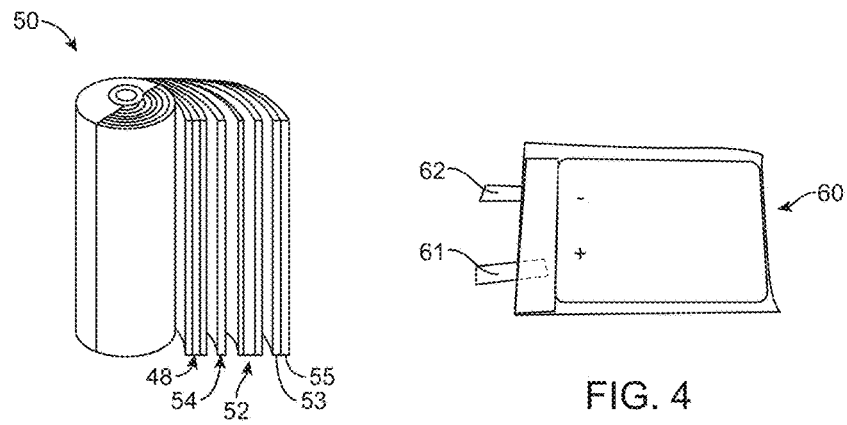
FIG. 3
FIG. 4
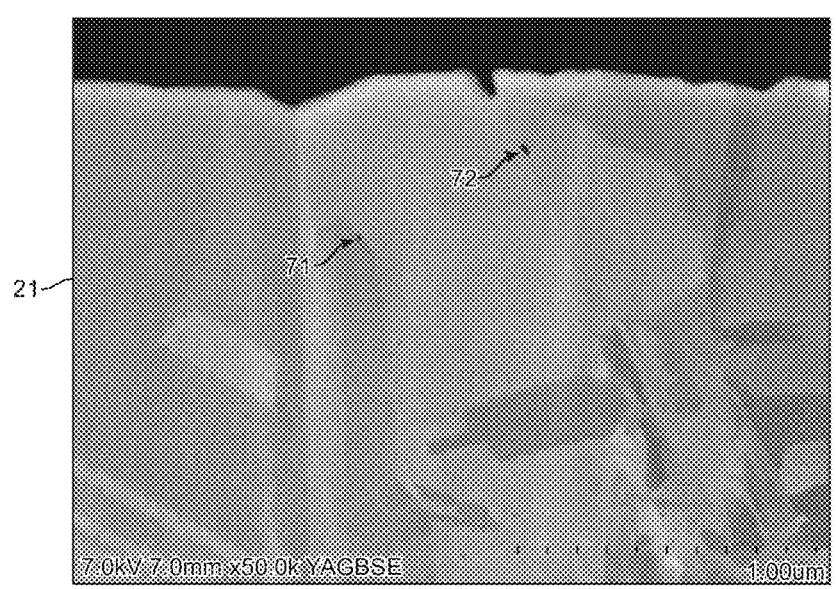
FIG. 5

COPPER FOIL FOR CURRENT COLLECTOR OF LITHIUM SECONDARY BATTERY

TECHNICAL FIELD

The present disclosure is directed to copper foils possessing a puncture strength making the foils suitable for a wide variety of uses. These copper foils find particular utility as current collectors in rechargeable secondary batteries, particularly in lithium secondary battery with high capacity. Methods of making the copper foils, method of producing negative electrode for use in lithium secondary battery and lithium secondary battery of high capacity are also described.

BACKGROUND

Electrification is the most viable way to achieve clean and efficient transportation that is crucial to the sustainable development of the entire world. In the near future, electric vehicles (EV), including hybrid electric vehicles (HEVs), plug-in hybrid electric vehicles (PHEVs), and pure battery electric vehicles (BEVs) will dominate the clean vehicle market. By 2020, it is expected that more than half of new vehicle sales will likely be EV models. The key and the enabling technology to this revolutionary change in transportation is the battery. EV batteries are quite different from those used in consumer electronic devices, such as laptops and cellphones. They are required to handle high power (up to a hundred kW) and have high energy capacity (up to tens of kW) within a limited space and weight and at an affordable price. The current two major battery types used in EVs today are nickel metal hydride (NiMH) and lithium secondary battery. Nearly all HEVs available in the market today use NiMH batteries because of its mature technology. Due to the potential of obtaining higher specific energy and energy density, the adoption of lithium secondary batteries is expected to grow fast in EVs, particularly in PHEVs and BEVs.

The negative electrode current collector of a lithium secondary battery is generally made using copper foil. The negative electrode is formed by coating the surface of the copper foil (current collector) with carbon powder, or other negative electrode active materials processed to a paste, drying this paste, then press flattening the negative electrode active materials by rolling or other pressure application. This composite of copper foil and compressed negative electrode active material is then, together with a separator, and an aluminum foil coated with a positive electrode active material, rolled up to form a cylindrical lithium secondary battery.

An alternative form of the lithium secondary battery is the laminated type lithium secondary battery. A laminated type lithium secondary battery boasts of advanced heat dissipation as compared to conventional cylindrical batteries. Because the laminated type lithium secondary battery has a broad surface area, the laminated type lithium secondary battery is better able to dissipate heat, and increases in the overall temperature of the battery due to charging and discharging can be kept low. Therefore, electric vehicles that adopt batteries of laminated type can simplify countermeasures against heat.

With an increase in the energy density and the capacity of the lithium secondary battery, and the need for the volumetric shrinkage rate of the negative electrode active material increasing, the required strength for the current collector is also increasing. Particularly, a metal alloy-based negative electrode active material containing silicon ("Si"), tin ("Sn") or the like has several to several ten times the volumetric expansion higher than the conventional carbon material during the charging/discharging reaction.

For manufacturing a copper foil with stable, excellent properties for battery performance, one should impart to the copper foil during its manufacture various important properties. Included among such properties is a puncture strength that is suitable for employing the copper foil as a current collector in rechargeable secondary batteries of high capacity. With suitable puncture strength, the likelihood or probability that the copper foil will fracture during the charging/discharging cycle will be reduced. On the other hand, the negative electrode active material is closely adhered to the copper foil. Therefore, it suffers from the disadvantage that a large stress acts upon the negative electrode when the active material layer expands in volume due to the repetition of the charging/discharging cycle. When an electrode, with large expansion and contraction states is used in a rechargeable secondary battery, the charging/discharging cycle is repeated many times over the batteries' useful life repeatedly imparting stresses to the copper foil component of the electrode, whereby the negative electrode may be broken, resulting in a tremendous capacity reduction in the battery. For lithium secondary batteries with high capacity, which require a relatively high pressure to compress the negative electrode active materials onto the copper foil during production of the negative electrode, the copper foil is more likely to break during the pressing step of the manufacturing process of compressing the negative electrode active materials onto the copper foil.

After diligent research, the present inventors have found that copper foils suitable for use as current collectors in lithium secondary battery of high capacity must have a puncture strength within a range of values, but yet must not be too brittle as to fracture during the manufacturing of the consolidation of the negative electrode active material onto the copper foil by pressing. Various factors come into play when attempting to produce suitable copper foils for use in lithium secondary battery of high capacity as discussed in detail below. It is desirable to provide a rechargeable secondary battery, an electric tool, an electric vehicle, and a power storage system which can obtain an excellent battery capacity characteristic and cycle characteristics.

SUMMARY

The present inventors have produced copper foils having an acceptable puncture strength values suitable for use as current collectors in lithium secondary battery, but not being too brittle so as to fracture during the manufacturing process of consolidating the active materials onto the copper foil by pressing.

The present inventors have discovered a process of producing a copper foil by electrodepositing copper onto a drum from a liquid copper-containing electrolyte solution under the influence of an electric current to produce a copper foil having a drum side (the side of the foil in contact with the drum during production) and an opposed side or deposit side, where the grain size difference between the deposit side and the drum side is small.

The presence of an inorganic metal and/or organic additive in the liquid copper-containing electrolyte solution reduces the grain size difference between the deposit side and the drum side of the copper foil, and the number of voids produced by electrodeposition. The copper foils produced according to this disclosure have suitable puncture strength for use as current collectors in lithium secondary battery.

The present inventors have also discovered that if the surface roughness (Rz) of the copper foil is large, it becomes difficult to coat the copper foil with the negative electrode active materials in uniform thickness. Therefore, it is desirable that the surface roughness (Rz) of the deposit side is 2.0 µm or less. If the surface roughness Rz of the deposit side is less than 0.4 µm, adhesion to a negative electrode material tends to decrease. Therefore, it is more preferable that the surface roughness Rz is 0.4 µm or more. A preferred range of surface roughness of the copper foil is 0.8 µm to 1.7 µm. A more preferred range is 1.0 µm to 1.6 µm.

BRIEF DESCRIPTION OF THE DRAWINGS

FIG. 3 is a schematic representation of forming a cylindrical battery by winding;

FIG. 4 is a schematic representation of forming a laminated-type battery by stacking;

FIG. 5 is a scanning electron microscope ("SEM") image illustrating the presence of voids in a copper foil; and, FIG. 6 is a regression curve showing the relationship between area weight and puncture strength of the electrodeposited copper foil according to an embodiment of the disclosure.

DETAILED DESCRIPTION OF THE PREFERRED EMBODIMENTS

As used throughout the various drawing figures, like elements in different views may be given a common numeral labeling, to assist the reader in understanding the various embodiments.

As used throughout this specification and claims, surface roughness is measured and provided as "Rz" standard, (utilizing JIS B 0601-1994, using an α-type surface roughness and contour measuring instrument manufactured by Kosaka Laboratory Ltd. (Model Type: SE1700), although there are other systems available to measure surface roughness. Not all measurement systems of surface roughness are equivalent. According to this Rz standard, the results are presented as an average of 10 points.

Figure 1:
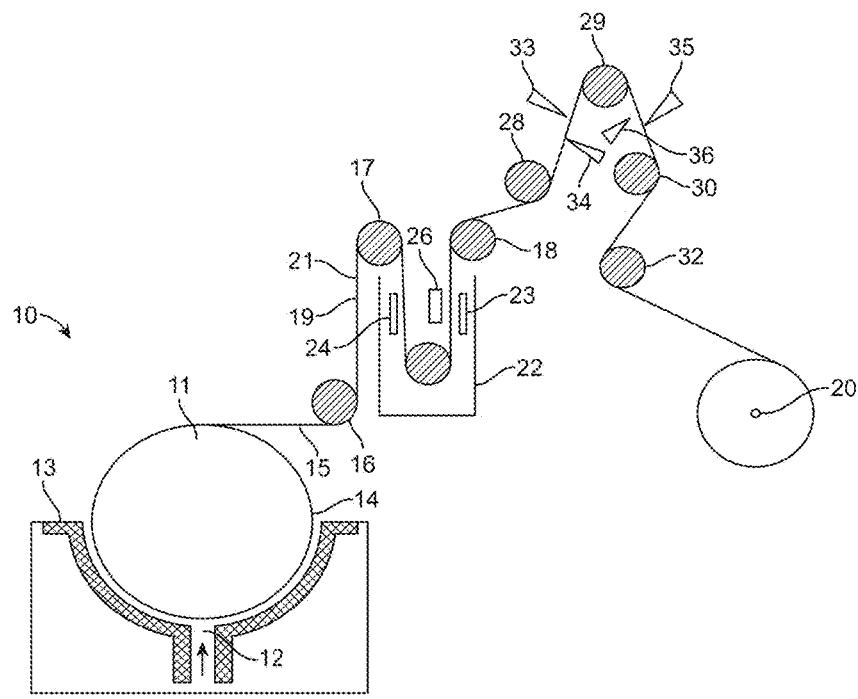
FIG. 1 is a schematic view of a process and apparatus for making a copper foil by electrodeposition from a copper-containing electrolyte solution onto a rotating drum, followed by separating the foil from the drum, coating the foil with an anti-tarnish agent and winding the foil upon a spool.

As shown in FIG. 1, a typical device 10 for manufacturing an electrodeposited copper foil is schematically illustrated. A rotatable metal negative electrode drum 11 is disposed in a partially submerged position with regard to a copper-containing electrolyte solution 12. An insoluble metal positive electrode 13, preferably insoluble in copper-containing electrolyte solution 12 is positioned in contact with copper-containing electrolyte solution 12. The insoluble metal positive electrode 13 is arranged at approximately the lower half of the metal negative electrode drum 11 and surrounds the metal negative electrode drum 11. The surface 14 of the rotatable metal negative electrode drum 11 can be polished to a mirror finish, thereby imparting the same finish to the drum side 15 of copper foil 21. Rollers 16, 17, 18 assist in stripping the copper foil from drum surface 14. The side of the copper foil 21, opposite the drum side 15 is called the deposit side 19, because the deposit side 19 is in contact with the copper-containing electrolyte solution 12 when it is formed. A copper foil 21 is continuously manufactured with the device by flowing a copper-containing electrolyte solution 12 between the negative electrode drum 11 and the positive electrode 13, applying direct current (DC) between the positive electrode and negative electrode to allow copper to be deposited on the surface 14 of negative electrode drum 11, and stripping and detaching an electrodeposited copper foil 21 from the negative electrode drum 11 when a predetermined thickness is obtained. The copper foil 21 so removed from drum 11 surface can be immediately further processed or would upon spool 20 for storage.

FIG. 1 further illustrates a schematic embodiment where the copper foil 21 is further processed immediately after removal from the negative electrode drum 11. Copper foil 21 is passed over guide roller 17 and into an anti-tarnish treatment tank 22. In treatment tank 22 is a treating solution, such as an organic agent, or alternatively, a solution which can contain zinc or chromium anti-tarnish agents, which are applied to copper foil 21 to prevent anti-tarnish and/or protect the property of the copper foil 21. Electrodes 23, 24 can be used in the case where electrolytic deposition of a metallic layer (such as one of the aforementioned anti-tarnish metals) onto the drum side 15 of copper foil 21 is desired. If it is desired to electrolytically deposit a metal on the deposit side 19 of copper foil 21, a further electrode 26 is provided. A series of guide rollers 18, 28, 29, 30, 32 conveys the copper foil 21 through and away from treatment tank 22. Air knives 33, 34, 35 and 36 are provided to carefully regulate and dry the anti-tarnish coating, as it is desired that the anti-tarnish layer be relatively thin as compared to the thickness of the copper foil as to not deleteriously affect the surface of the copper foil 21. Additional treatment tanks (not shown) can be provided for purposes of adding additional or different types of layers. After treatment, the copper foil 21 can be wound on spool 20 for storage or shipment.

The copper-containing electrolyte solution 12 can be formed by adding copper wires to a sulfuric acid solution to prepare a copper sulfate containing solution. By the use of copper wire, the copper content of the copper can be easily regulated to contain more than 99.9% pure copper. Inorganic metal can be added, such as nickel, for the purpose of controlling the presence of voids in the electrodeposited copper foil 21. If the nickel content is too high, the aforementioned voids can easily be formed and the conductivity of the copper foil is reduced. If the nickel content is too low, the grain size difference between the drum side and the deposit side of the copper foil is increased, which tends to diminish the cycle characteristics of the battery. Generally, the nickel should be present in an amount between 200-500 ppm ("parts per million"). Other additives can also be added to the copper-containing electrolyte solution to regulate the grain size difference between the drum side and the deposit side of the resulting copper foil 21. These additives include, but are not limited to gelatin, chloride ion, sodium 3-mercapto-1-propanesulfonate (MPS: HOPAX Company), polyethylene glycol (PEG-2000 (available from Sigma-Aldrich Company) and trimethyl thiourea.

As shown in the below Table 3 of Examples and Comparative Examples, the varying of these components will affect the resultant properties of the copper foils produced.

Figure 2:
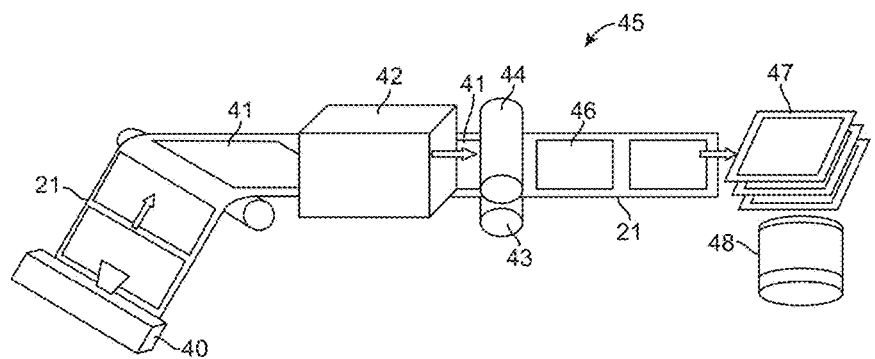
FIG. 2 is a schematic representation of the process of forming a negative electrode by coating an active material onto a copper foil, including drying and pressing steps to consolidate the active material onto the copper foil; followed by either slitting or winding.

FIG. 2 is a schematic representation of forming a battery component. A slurry of active materials and a binder is fed to a coating device 40 and deposited, continuously or discontinuously, onto copper foil 21. The deposited slurry is dried in an oven at an elevated temperature to remove the solvent in the slurry. Temperatures in the range of 140° C. to 170° C., preferably 160° C. are suitable with the residence time in the oven 42 being regulated to achieve the required degree of drying. Typically a pressing apparatus, such as the opposed rollers 43, 44 of roller press 45 apply elevated pressure to consolidate the active materials 41 onto copper foil 21 as they both pass through the nip of roller press 45. High pressure on the order of 2800-3200 psi ("pounds per square inch"), preferably 3000 psi, are applied to densify the active materials to form a consolidated mass of active material 46 on copper foil 21. Depending upon whether the slurry of active materials was deposited intermittently, the copper foil 21, with consolidated active materials 46, are subjected to slitting to form individual negative electrode 47 for use in producing laminated type battery, or if deposited continuously upon copper foil 21, the consolidated material is wound as at continuous negative electrode 48 for use in producing cylindrical battery.

FIG. 3 is illustrative of the formation of a cylindrical battery 50 in which the continuous negative electrode 48 is wound with an aluminum foil containing positive electrode material 52 with a separator 53, 54 between them and then seal in battery can 55 to form the cylindrical battery 50. The number of revolutions of the continuous negative electrode 48, the aluminum foil with positive electrode active material 52 and the separator 53 will determine the diameter of the final battery. Cylindrical lithium secondary batteries (also known as wound type batteries), have an positive electrode and a negative electrode which are cut into two long strips, and together with a separator, that keeps the positive electrode and negative electrode apart, are wound on a cylindrical mandrel, to form a jelly roll (also known as a Swiss roll in the United Kingdom). Cylindrical battery thus has only two electrode strips which simplifies the construction of the battery considerably. The cylindrical design has good cycling ability, offers a long calendar life and is economical, but is heavy and has low packaging density due to it space cavities. The cylindrical battery is commonly used for portable applications.

On the other hand the laminated type battery 60 schematically illustrated in FIG. 4 is formed by stacking a consolidated negative electrode active material on a copper foil, such as the negative electrode 47 of FIG. 2 with alternating positive electrode active material on an aluminum foil with a separator in between them until a stack of sufficient quantity is formed and placed between laminated plastic covers, filled with electrolyte and sealed to form the battery 60. Leads 61, 62 for positive and negative connections, respectively, can be provided from the stacked alternating laminae. In order to have high energy capacity, the thickness of the copper foil needs to be decreased, because at a same volume of a lithium secondary battery, more active materials can be employed.

The decrease in thickness of the copper foil 21 means that any voids in the copper foil volume will have the effect of a pinhole through the copper foil. This is illustrated in FIG. 5 which is a SEM at a magnification of 50,000 times. Using a Nova NanoLab 200 DB-FIB ("Dual-beam focused ion beam)-SEM ("Scanning Electron Microscope"), manufactured by FEI Company, a cross-section of the copper foil was processed by FIB. The SEM images of an area of 1 µm$^2$, at a magnification of 50,000 times, the Nova NanoLab 200 DB-FIB, operated at 3 kV using secondary electron detection are shown to measure the number of voids. The number of voids 71, 72, etc. as shown in FIG. 5, each having a 0.01 µm or more of a circle diameter were each counted in the sample.

Test Methods

1. Puncture strength—A test piece with a size of 120 mm in length×30 mm in width was tailored from each of the electrodeposited copper foils, and needle penetration test is performed using a universal testing machine (TKS-20N made by IMADA), measurement was performed at room temperature (15~35° C.), with a needle (MS2-1R7 made by RENISHAW or Mitutoyo), entry speed being 50 mm/min. The maximum load acting on the copper foil when the specimen underwent penetration of the copper foil was read. A value obtained by the load of the specimen is determined as puncture strength (N). The measurement was performed 5 times each for the deposit side and for the drum side of each sample. Puncture strength for deposit side and for the drum side were then calculated by averaging the respective side's 5 measurements. The puncture strength of electrodeposited copper foil was then determined by taking average of the puncture strength values from each side.

2. Area weight and Thickness—A test piece with a size of 100 mm in length×100 mm in width was tailored from each of the electrodeposited copper foils, and an AG-204 type microbalance manufactured by Mettler Toledo International Inc. was used to measure the test piece. For each of the test pieces, the numerical value in the reading taken was multiplied by 100 to obtain an area weight (g/m$^2$). A thickness of the electrodeposited copper foil means Mean average thickness using Test Method 2.4.18 of IPC-TM-650.

Mean average thickness (µm)=Weight of sample in grams/(Area of sample in square meter×Density of electrodeposited copper)

The density of electrodeposited copper in present invention is 8.909 gm/cm$^3$

3. Grain size—The cross-section of the copper foil is processed by CP ("Cross-section Polisher"), Gatan Ilion II. A specific section processed by CP is observed by EBSD ("Electron Back Scatter Diffraction") to measure the grain size of the copper foil. As the SEM, JSM-6500F manufactured by JEOL Ltd., with EBSD detector, NordlysNano manufactured by Oxford Instruments was used. The analysis software had Axtec HKL, HKL Channel5. The measurement used herein used the HKL Channel5. Grain size at the drum and deposit side obtained from the analysis by an EBSD in a depth direction of 2 µm from the surface.

4. Charge-discharge cycle test—A laminated type lithium secondary battery was prepared as follows and subjected to a high c-rate charging and discharging test. N-methyl-2-pyrollidone (NMP) was used as a solvent for a positive electrode material (at a solid to liquid ratio of 195 wt. % (100 g of the positive electrode material: 195 g of NMP)) as shown in Table 1 below, so as to obtain a positive electrode slurry. NMP was used as a solvent for a negative electrode material (at a solid to liquid ratio of 60 wt. % (100 g of the negative electrode material: 60 g of NMP), so as to obtain a negative electrode slurry.

TABLE 1

| Positive electrode material formulation: Based on the total weight of the positive electrode material | |
|---|---|
| Positive electrode active substance (LiCoO$_2$) | 89 wt. % |
| Conductive additive (Flaked graphite; KS6) | 5 wt. % |
| Conductive additive (Conductive carbon powder; Super P ®) | 1 wt. % |

TABLE 1-continued

| | |
|---|---|
| Solvent-Based Binder (PVD1300) | 5 wt. % |
| Negative electrode material formulation: Based on the total weight of the negative electrode material | |
| Negative electrode active substance (MGPA) | 93.9 wt. % |
| Conductive additive (Conductive carbon powder; Super P ®) | 1 wt. % |
| Solvent-Based Binder (PVDF6020) | 5 wt. % |
| Oxalic acid | 0.1 wt % |

The foregoing negative electrode active substance, as a slurry, was coated on copper foil, and a positive electrode slurry was coated on an aluminum foil. After the solvents were evaporated, the positive electrode and negative electrode were individually pressed, and slitted into certain sizes. Afterwards, negative electrode and positive electrode are alternately stacked, with a separator (manufactured by Celgard Company) sandwiched between them, and placed in a container molded of laminate film. The container was filled with electrolyte, and sealed to form the battery. The size of the laminated type battery was 41 mm×34 mm×53 mm. The charging mode was the constant current-constant voltage ("CCCV") mode, the charging voltage was 4.2 V, and the charging current constant was 5 C. The discharging mode was the constant current ("CC") mode, the discharging voltage was 2.8 V, and the discharging current was 5 C. The charging-discharging test was conducted at an elevated temperature (at 55° C.). Cycle life is defined as the number of charge-discharge cycles a battery can perform before its nominal capacity falls below 80% of its initial rated capacity. Cycle life test will be performed on a copper foil only if it has passed fracture of negative electrode test.

5. Surface roughness (Rz)—The measurement was conducted based on the method of JIS B 0601-1994 by using α Type Surface Roughness Measuring Instrument (Kosaka Laboratory Ltd.: SE1700 series. Rz (Ten points Mean Roughness) is obtained from the total (in micron meter (μm)) of the mean value of the each distance mean line and 5 peaks from the highest one, and the mean value of each distance between the mean line and 5 valleys from the lowest one, of the roughness curve in the range of sampled reference length.

6. Number of voids—Using a Nova NanoLab 200 DB-FIB ("Dual-beam focused ion beam)-SEM ("Scanning Electron Microscope"), manufactured by FEI Company, a cross-section of the copper foil was processed by FIB. The SEM images of an area of 1 μm$^2$, at a magnification of 50,000 times, the Nova NanoLab 200 DB-FIB, operated at 3 kV using secondary electron detection are shown to measure the number of voids. The number of voids each having a 0.01 μm or more of a circle diameter were counted for each of the Examples and Comparative Examples in the below Table 3.

7. Fracture of negative electrode—A negative electrode slurry was prepared using N-methyl-2-pyrollidone (NMP) as a solvent and the negative electrode materials listed in Table 2 below with a solid-liquid ratio of 60% (100 g of negative electrode materials; 60 g of NMP). After the components of the negative electrode material formulation are mixed, the carbon material slurry is coated on the surface of copper foil at a speed of 5 meters per minute ("mpm") to a thickness of 200 μm and then dried through a 160° C. oven. The negative electrode (copper foil+negative electrode active material) was then pressed. The dimension of the rollers of the pressing apparatus were φ250 mm×250 mm, hardness of the rollers was 62~65 HRC, and the roller material was high-carbon chrome bearing steel (SUJ2). A 1 M/min ("meter per minute") pressing speed and 3000 psi pressure were used and then observed to see whether the interface between the copper foil and negative electrode active material was not broken (referred to in Table 4 as "OK"), or if it was broken (it was referred to in Table 4 as "NG").

TABLE 2

| Negative Electrode Material | % Based on Total Weight of Negative Electrode Materials |
|---|---|
| Negative Electrode Active Material (Mesophase Graphite Powder Anode; MGPA) | 93.9 wt. % |
| Conductive Additive (Conductive Carbon Black; Super P ®) | 1 wt. % |
| Solvent-Based Binder (PVDF6020, i.e., polyvinylidene fluoride) | 5 wt. % |
| Oxalic Acid | 0.1 wt. % |

Results of Examples and Comparative Examples

The following Table 3 illustrates the parameter condition for producing copper foils in the Examples and Comparative Examples. The following Table 4 illustrates the effect of varying parameter condition on the resulting properties of the copper foils produced in the Examples and Comparative Examples. It should be clearly understood that these are additional and more favorable conditions for achieving the electrodeposited copper foil for a lithium secondary battery according to the present invention. It should be understood within the scope of the present disclosure, the above-mentioned technical features and technical features mentioned below (such as example) can be combined freely and mutually to form new or preferred technical solutions, which are omitted for brevity.

TABLE 3

| | Condition | | | | | | | | | | |
|---|---|---|---|---|---|---|---|---|---|---|---|
| | Manufacture of Electrodeposited Copper Foil | | | | | | | | | Surface Anti-Tarnish Treatment | |
| | CuSO$_4$·5H$_2$O (g/L) | H$_2$SO$_4$ (g/L) | Cl (ppm) | current (ASD) | Temp (° C.) | PEG-2000 (ppm) | Trimethyl thiourea (ppm) | MPS (ppm) | Ni (ppm) | CrO$^3$ (g/l) | Current density (A/dm$^2$) |
| Example 1 | 300 | 100 | 50 | 33 | 45 | 1.00 | 1.45 | 1.35 | 498 | 1.5 | 0.5 |
| Example 2 | 300 | 100 | 50 | 33 | 45 | 1.00 | 1.45 | 1.35 | 207 | 1.5 | 0.5 |
| Example 3 | 300 | 100 | 50 | 33 | 45 | 1.00 | 0.65 | 1.35 | 498 | 1.5 | 0.5 |
| Example 4 | 300 | 100 | 50 | 33 | 45 | 1.00 | 0.65 | 1.35 | 207 | 1.5 | 0.5 |
| Example 5 | 300 | 100 | 50 | 33 | 45 | 1.45 | 1.45 | 1.35 | 498 | 1.5 | 0.5 |

TABLE 3-continued

| | Condition | | | | | | | | | |
|---|---|---|---|---|---|---|---|---|---|---|
| | Manufacture of Electrodeposited Copper Foil | | | | | | | | Surface Anti-Tarnish Treatment | |
| | $CuSO_4 \cdot 5H_2O$ (g/L) | $H_2SO_4$ (g/L) | Cl (ppm) | current (ASD) | Temp (° C.) | PEG-2000 (ppm) | Trimethyl thiourea (ppm) | MPS (ppm) | Ni (ppm) | $CrO^3$ (g/l) | Current density (A/dm²) |
| Example 6 | 300 | 100 | 50 | 33 | 45 | 1.45 | 1.45 | 1.35 | 207 | 1.5 | 0.5 |
| Example 7 | 300 | 100 | 50 | 33 | 45 | 1.45 | 0.65 | 1.35 | 498 | 1.5 | 0.5 |
| Example 8 | 300 | 100 | 50 | 33 | 45 | 1.45 | 0.65 | 1.35 | 207 | 1.5 | 0.5 |
| Comparative example 1 | 300 | 100 | 50 | 33 | 45 | 1.00 | 1.45 | 1.35 | 612 | 1.5 | 0.5 |
| Comparative example 2 | 300 | 100 | 50 | 33 | 45 | 1.00 | 1.45 | 1.35 | 98 | 1.5 | 0.5 |
| Comparative example 3 | 300 | 100 | 50 | 33 | 45 | 1.00 | 0.65 | 1.35 | 612 | 1.5 | 0.5 |
| Comparative example 4 | 300 | 100 | 50 | 33 | 45 | 1.00 | 0.65 | 1.35 | 98 | 1.5 | 0.5 |
| Comparative example 5 | 300 | 100 | 50 | 33 | 45 | 1.45 | 1.45 | 1.35 | 612 | 1.5 | 0.5 |
| Comparative example 6 | 300 | 100 | 50 | 33 | 45 | 1.45 | 1.45 | 1.35 | 98 | 1.5 | 0.5 |
| Comparative example 7 | 300 | 100 | 50 | 33 | 45 | 1.45 | 0.65 | 1.35 | 612 | 1.5 | 0.5 |
| Comparative example 8 | 300 | 100 | 50 | 33 | 45 | 1.45 | 0.65 | 1.35 | 98 | 1.5 | 0.5 |
| Comparative example 9 | 300 | 100 | 50 | 33 | 45 | 1.00 | 1.55 | 1.35 | 498 | 1.5 | 0.5 |
| Comparative example 10 | 300 | 100 | 50 | 33 | 45 | 1.00 | 1.55 | 1.35 | 207 | 1.5 | 0.5 |
| Comparative example 11 | 300 | 100 | 50 | 33 | 45 | 1.00 | 0.55 | 1.35 | 498 | 1.5 | 0.5 |
| Comparative example 12 | 300 | 100 | 50 | 33 | 45 | 1.00 | 0.55 | 1.35 | 207 | 1.5 | 0.5 |
| Comparative example 13 | 300 | 100 | 50 | 33 | 45 | 1.45 | 1.55 | 1.35 | 498 | 1.5 | 0.5 |
| Comparative example 14 | 300 | 100 | 50 | 33 | 45 | 1.45 | 1.55 | 1.35 | 207 | 1.5 | 0.5 |
| Comparative example 15 | 300 | 100 | 50 | 33 | 45 | 1.45 | 0.55 | 1.35 | 498 | 1.5 | 0.5 |
| Comparative example 16 | 300 | 100 | 50 | 33 | 45 | 1.45 | 0.55 | 1.35 | 207 | 1.5 | 0.5 |
| Comparative example 17 | 300 | 100 | 50 | 33 | 45 | 0.90 | 1.45 | 1.35 | 498 | 1.5 | 0.5 |
| Comparative example 18 | 300 | 100 | 50 | 33 | 45 | 0.90 | 1.45 | 1.35 | 207 | 1.5 | 0.5 |
| Comparative example 19 | 300 | 100 | 50 | 33 | 45 | 0.90 | 0.65 | 1.35 | 498 | 1.5 | 0.5 |
| Comparative example 20 | 300 | 100 | 50 | 33 | 45 | 0.90 | 0.65 | 1.35 | 207 | 1.5 | 0.5 |
| Comparative example 21 | 300 | 100 | 50 | 33 | 45 | 1.55 | 1.45 | 1.35 | 498 | 1.5 | 0.5 |
| Comparative example 22 | 300 | 100 | 50 | 33 | 45 | 1.55 | 1.45 | 1.35 | 207 | 1.5 | 0.5 |
| Comparative example 23 | 300 | 100 | 50 | 33 | 45 | 1.55 | 0.65 | 1.35 | 498 | 1.5 | 0.5 |
| Comparative example 24 | 300 | 100 | 50 | 33 | 45 | 1.55 | 0.65 | 1.35 | 207 | 1.5 | 0.5 |
| Example 9 | 300 | 100 | 50 | 33 | 45 | 1.00 | 1.45 | 1.35 | 498 | 1.5 | 0.5 |
| Example 10 | 300 | 100 | 50 | 33 | 45 | 1.45 | 0.65 | 1.35 | 207 | 1.5 | 0.5 |
| Comparative example 25 | 300 | 100 | 50 | 33 | 45 | 1.00 | 1.45 | 1.35 | 612 | 1.5 | 0.5 |
| Comparative example 26 | 300 | 100 | 50 | 33 | 45 | 1.00 | 1.45 | 1.35 | 98 | 1.5 | 0.5 |
| Example 11 | 300 | 100 | 50 | 33 | 45 | 1.00 | 1.45 | 1.35 | 498 | 1.5 | 0.5 |
| Example 12 | 300 | 100 | 50 | 33 | 45 | 1.45 | 0.65 | 1.35 | 207 | 1.5 | 0.5 |
| Comparative example 27 | 300 | 100 | 50 | 33 | 45 | 1.00 | 1.45 | 1.35 | 612 | 1.5 | 0.5 |
| Comparative example 28 | 300 | 100 | 50 | 33 | 45 | 1.00 | 1.45 | 1.35 | 98 | 1.5 | 0.5 |
| Example 13 | 300 | 100 | 50 | 33 | 45 | 1.00 | 1.45 | 1.35 | 498 | 1.5 | 0.5 |
| Example 14 | 300 | 100 | 50 | 33 | 45 | 1.45 | 0.65 | 1.35 | 207 | 1.5 | 0.5 |
| Comparative example 29 | 300 | 100 | 50 | 33 | 45 | 1.00 | 1.45 | 1.35 | 612 | 1.5 | 0.5 |
| Comparative example 30 | 300 | 100 | 50 | 33 | 45 | 1.00 | 1.45 | 1.35 | 98 | 1.5 | 0.5 |
| Example 15 | 300 | 100 | 50 | 33 | 45 | 1.00 | 1.45 | 1.35 | 498 | 1.5 | 0.5 |

TABLE 3-continued

| | Condition | | | | | | | | | |
|---|---|---|---|---|---|---|---|---|---|---|
| | Manufacture of Electrodeposited Copper Foil | | | | | | | | Surface Anti-Tarnish Treatment | |
| | CuSO₄·5H₂O (g/L) | H₂SO₄ (g/L) | Cl (ppm) | current (ASD) | Temp (° C.) | PEG-2000 (ppm) | Trimethyl thiourea (ppm) | MPS (ppm) | Ni (ppm) | CrO³ (g/l) | Current density (A/dm²) |
|---|---|---|---|---|---|---|---|---|---|---|---|
| Example 16 | 300 | 100 | 50 | 33 | 45 | 1.45 | 0.65 | 1.35 | 207 | 1.5 | 0.5 |
| Comparative example 31 | 300 | 100 | 50 | 33 | 45 | 1.00 | 1.45 | 1.35 | 612 | 1.5 | 0.5 |
| Comparative example 32 | 300 | 100 | 50 | 33 | 45 | 1.00 | 1.45 | 1.35 | 98 | 1.5 | 0.5 |
| Example 17 | 300 | 100 | 50 | 33 | 45 | 1.00 | 1.45 | 1.35 | 498 | 1.5 | 0.5 |
| Example 18 | 300 | 100 | 50 | 33 | 45 | 1.45 | 0.65 | 1.35 | 207 | 1.5 | 0.5 |
| Comparative example 33 | 300 | 100 | 50 | 33 | 45 | 1.00 | 1.45 | 1.35 | 612 | 1.5 | 0.5 |
| Comparative example 34 | 300 | 100 | 50 | 33 | 45 | 1.00 | 1.45 | 1.35 | 98 | 1.5 | 0.5 |
| Example 19 | 300 | 100 | 50 | 33 | 45 | 1.00 | 1.45 | 1.35 | 498 | 1.5 | 0.5 |
| Example 20 | 300 | 100 | 50 | 33 | 45 | 1.45 | 0.65 | 1.35 | 207 | 1.5 | 0.5 |
| Comparative example 35 | 300 | 100 | 50 | 33 | 45 | 1.00 | 1.45 | 1.35 | 612 | 1.5 | 0.5 |
| Comparative example 36 | 300 | 100 | 50 | 33 | 45 | 1.00 | 1.45 | 1.35 | 98 | 1.5 | 0.5 |

It is apparent that various changes in parameters have an effect on the resulting properties of the electrodeposited copper foil produced and the cycle life of the electrodeposited copper foil when used as a current collector in a secondary battery during charge-discharge test of the secondary battery. The following Table 4 illustrates the change in grain size and grain size difference for the deposit side and the drum side, as well as the result on puncture strength (N) properties on the deposit side and drum side (as well as average) of a electrodeposited copper foil as changes occur in the presence and amounts of the PEG-2000, trimethyl thiourea, and nickel components of the copper foil, while maintaining all other variables constant.

TABLE 4

| | Thickness (μm) | Area weight (g/m²) | Grain size (um) | | | Puncture strength (N) | | | Fracture of negative electrode | Surface roughness of deposit side (μm) | Void (Number/μm²) | Cycle life (cycles) |
|---|---|---|---|---|---|---|---|---|---|---|---|---|
| | | | Deposit side | Drum side | Difference | Deposit side | Drum side | Electro-deposited copper foil | | | | |
| Example 1 | 8 | 71.2 | 0.42 | 0.37 | 0.05 | 3.64 | 3.60 | 3.62 | OK | 1.57 | 3 | 1218 |
| Example 2 | 8 | 71.2 | 0.49 | 0.37 | 0.12 | 3.77 | 3.43 | 3.60 | OK | 0.80 | 0 | 1137 |
| Example 3 | 8 | 71.2 | 0.63 | 0.36 | 0.27 | 2.95 | 2.85 | 2.90 | OK | 1.92 | 2 | 1042 |
| Example 4 | 8 | 71.2 | 0.74 | 0.36 | 0.38 | 1.45 | 1.33 | 1.39 | OK | 1.21 | 1 | 946 |
| Example 5 | 8 | 71.2 | 0.51 | 0.35 | 0.16 | 3.58 | 3.60 | 3.59 | OK | 1.12 | 3 | 1189 |
| Example 6 | 8 | 71.2 | 0.62 | 0.36 | 0.26 | 2.95 | 3.15 | 3.05 | OK | 0.40 | 0 | 1086 |
| Example 7 | 8 | 71.2 | 0.73 | 0.37 | 0.36 | 1.45 | 1.41 | 1.43 | OK | 1.47 | 2 | 969 |
| Example 8 | 8 | 71.2 | 0.89 | 0.35 | 0.54 | 1.27 | 1.30 | 1.29 | OK | 0.76 | 0 | 905 |
| Comparative example 1 | 8 | 71.2 | 0.36 | 0.36 | 0.00 | 3.79 | 3.82 | 3.81 | NG | 2.49 | 5 | — |
| Comparative example 2 | 8 | 71.2 | 0.94 | 0.37 | 0.57 | 0.99 | 0.95 | 0.97 | OK | 0.91 | 1 | 715 |
| Comparative example 3 | 8 | 71.2 | 0.61 | 0.35 | 0.26 | 2.91 | 3.09 | 3.00 | OK | 2.75 | 6 | 582 |
| Comparative example 4 | 8 | 71.2 | 1.05 | 0.36 | 0.69 | 0.97 | 0.96 | 0.97 | OK | 1.13 | 0 | 651 |
| Comparative examples | 8 | 71.2 | 0.53 | 0.36 | 0.17 | 3.58 | 3.68 | 3.63 | OK | 2.09 | 8 | 739 |
| Comparative example 6 | 8 | 71.2 | 1.10 | 0.37 | 0.73 | 0.85 | 0.86 | 0.86 | OK | 0.46 | 1 | 701 |
| Comparative example 7 | 8 | 71.2 | 0.76 | 0.37 | 0.39 | 1.32 | 1.43 | 1.38 | OK | 2.31 | 6 | 472 |
| Comparative example 8 | 8 | 71.2 | 1.12 | 0.35 | 0.77 | 0.82 | 0.86 | 0.84 | OK | 0.75 | 0 | 723 |
| Comparative example 9 | 8 | 71.2 | 1.05 | 0.37 | 0.68 | 0.85 | 0.89 | 0.87 | OK | 1.42 | 0 | 695 |
| Comparative example 10 | 8 | 71.2 | 1.11 | 0.35 | 0.76 | 0.85 | 0.79 | 0.82 | OK | 0.78 | 0 | 609 |
| Comparative | 8 | 71.2 | 1.04 | 0.36 | 0.68 | 0.89 | 0.87 | 0.88 | OK | 2.10 | 1 | 682 |

TABLE 4-continued

| | Thickness (μm) | Area weight (g/m²) | Grain size (um) | | | Puncture strength (N) | | | Fracture of negative electrode | Surface roughness of deposit side (μm) | Void (Number/μm²) | Cycle life (cycles) |
|---|---|---|---|---|---|---|---|---|---|---|---|---|
| | | | Deposit side | Drum side | Difference | Deposit side | Drum side | Electro-deposited copper foil | | | | |
| Comparative example 11 | 8 | 71.2 | 1.23 | 0.36 | 0.87 | 0.75 | 0.79 | 0.77 | OK | 1.42 | 0 | 709 |
| Comparative example 12 | 8 | 71.2 | 1.16 | 0.36 | 0.80 | 0.81 | 0.79 | 0.80 | OK | 1.06 | 3 | 716 |
| Comparative example 13 | 8 | 71.2 | 1.28 | 0.37 | 0.91 | 0.70 | 0.69 | 0.70 | OK | 0.34 | 0 | 501 |
| Comparative example 14 | 8 | 71.2 | 1.20 | 0.35 | 0.85 | 0.76 | 0.69 | 0.73 | OK | 1.68 | 2 | 632 |
| Comparative example 15 | 8 | 71.2 | 1.33 | 0.37 | 0.96 | 0.72 | 0.70 | 0.71 | OK | 1.05 | 1 | 642 |
| Comparative example 16 | 8 | 71.2 | 0.95 | 0.36 | 0.59 | 0.99 | 1.02 | 1.01 | OK | 1.75 | 0 | 708 |
| Comparative example 17 | 8 | 71.2 | 1.06 | 0.35 | 0.71 | 0.89 | 0.85 | 0.87 | OK | 1.16 | 0 | 720 |
| Comparative example 18 | 8 | 71.2 | 1.11 | 0.35 | 0.76 | 0.78 | 0.85 | 0.82 | OK | 2.14 | 1 | 582 |
| Comparative example 19 | 8 | 71.2 | 1.28 | 0.36 | 0.92 | 0.69 | 0.68 | 0.69 | OK | 1.49 | 2 | 660 |
| Comparative example 20 | 8 | 71.2 | 0.96 | 0.37 | 0.59 | 1.01 | 0.95 | 0.98 | OK | 0.99 | 0 | 691 |
| Comparative example 21 | 8 | 71.2 | 1.04 | 0.35 | 0.69 | 0.91 | 0.96 | 0.94 | OK | 0.37 | 4 | 591 |
| Comparative example 22 | 8 | 71.2 | 1.13 | 0.36 | 0.77 | 0.78 | 0.80 | 0.79 | OK | 1.32 | 2 | 624 |
| Comparative example 23 | 8 | 71.2 | 1.26 | 0.37 | 0.89 | 0.75 | 0.71 | 0.73 | OK | 0.66 | 3 | 628 |
| Example 9 | 3 | 26.7 | 0.42 | 0.36 | 0.06 | 0.58 | 0.59 | 0.59 | OK | 1.71 | 0 | 1220 |
| Example 10 | 3 | 26.7 | 0.88 | 0.36 | 0.52 | 0.04 | 0.05 | 0.05 | OK | 0.82 | 1 | 903 |
| Comparative example 25 | 3 | 26.7 | 0.36 | 0.36 | 0.00 | 0.70 | 0.72 | 0.71 | NG | 2.55 | 6 | — |
| Comparative example 26 | 3 | 26.7 | 0.95 | 0.37 | 0.58 | 0.00 | 0.01 | 0.01 | OK | 1.00 | 0 | 726 |
| Example 11 | 5 | 42.3 | 0.42 | 0.35 | 0.07 | 1.68 | 1.70 | 1.69 | OK | 1.68 | 2 | 1210 |
| Example 12 | 5 | 42.3 | 0.90 | 0.36 | 0.54 | 0.45 | 0.49 | 0.47 | OK | 0.81 | 1 | 910 |
| Comparative example 27 | 5 | 42.3 | 0.37 | 0.36 | 0.01 | 1.81 | 1.85 | 1.83 | NG | 2.57 | 6 | — |
| Comparative example 28 | 5 | 42.3 | 0.93 | 0.36 | 0.56 | 0.30 | 0.32 | 0.31 | OK | 0.99 | 1 | 721 |
| Example 13 | 6 | 53.4 | 0.44 | 0.37 | 0.07 | 2.39 | 2.46 | 2.43 | OK | 1.61 | 0 | 1221 |
| Example 14 | 6 | 53.4 | 0.89 | 0.36 | 0.53 | 0.76 | 0.80 | 0.78 | OK | 0.80 | 2 | 902 |
| Comparative example 29 | 6 | 53.4 | 0.35 | 0.36 | 0.01 | 2.70 | 2.76 | 2.73 | NG | 2.53 | 5 | — |
| Comparative example 30 | 6 | 53.4 | 0.94 | 0.35 | 0.59 | 0.58 | 0.60 | 0.59 | OK | 0.95 | 2 | 705 |
| Example 15 | 12 | 106.8 | 0.42 | 0.35 | 0.07 | 5.84 | 5.80 | 5.82 | OK | 1.52 | 1 | 1189 |
| Example 16 | 12 | 106.8 | 0.88 | 0.36 | 0.52 | 2.36 | 2.38 | 2.37 | OK | 0.72 | 1 | 921 |
| Comparative example 31 | 12 | 106.8 | 0.36 | 0.36 | 0.00 | 6.09 | 6.14 | 6.12 | NG | 2.37 | 7 | — |
| Comparative example 32 | 12 | 106.8 | 0.94 | 0.35 | 0.59 | 2.10 | 2.15 | 2.13 | OK | 0.87 | 3 | 713 |
| Example 17 | 20 | 178.0 | 0.43 | 0.35 | 0.08 | 9.72 | 9.78 | 9.75 | OK | 1.42 | 2 | 1204 |
| Example 18 | 20 | 178.0 | 0.90 | 0.37 | 0.53 | 4.80 | 4.76 | 4.78 | OK | 0.69 | 0 | 906 |
| Comparative example 33 | 20 | 178.0 | 0.37 | 0.36 | 0.01 | 10.42 | 10.49 | 10.46 | NG | 2.31 | 6 | — |
| Comparative example 34 | 20 | 178.0 | 0.95 | 0.36 | 0.59 | 4.65 | 4.61 | 4.63 | OK | 0.85 | 2 | 722 |
| Example 19 | 37 | 329.4 | 0.42 | 0.37 | 0.05 | 15.74 | 15.70 | 15.72 | OK | 1.20 | 0 | 1204 |
| Example 20 | 37 | 329.4 | 0.89 | 0.35 | 0.54 | 10.95 | 11.01 | 10.98 | OK | 0.65 | 2 | 906 |
| Comparative example 35 | 37 | 329.4 | 0.36 | 0.36 | 0.00 | 16.50 | 16.70 | 16.60 | NG | 2.29 | 8 | — |
| Comparative example 36 | 37 | 329.4 | 0.93 | 0.36 | 0.57 | 10.51 | 10.48 | 10.50 | OK | 0.82 | 1 | 722 |

It can therefore be seen that the puncture strength of the electrodeposited copper foil must be high, but not too high such that the copper foil is brittle leading to failures of the copper foil during manufacture of a negative electrode by pressing the active materials onto the copper foil. Nor can the foil have too low puncture strength such that it fails during repeated charging-discharging cycles when used in a secondary battery. Furthermore, the copper foil must be manufactured without too many voids which also lead to battery failure.

Figure 6:
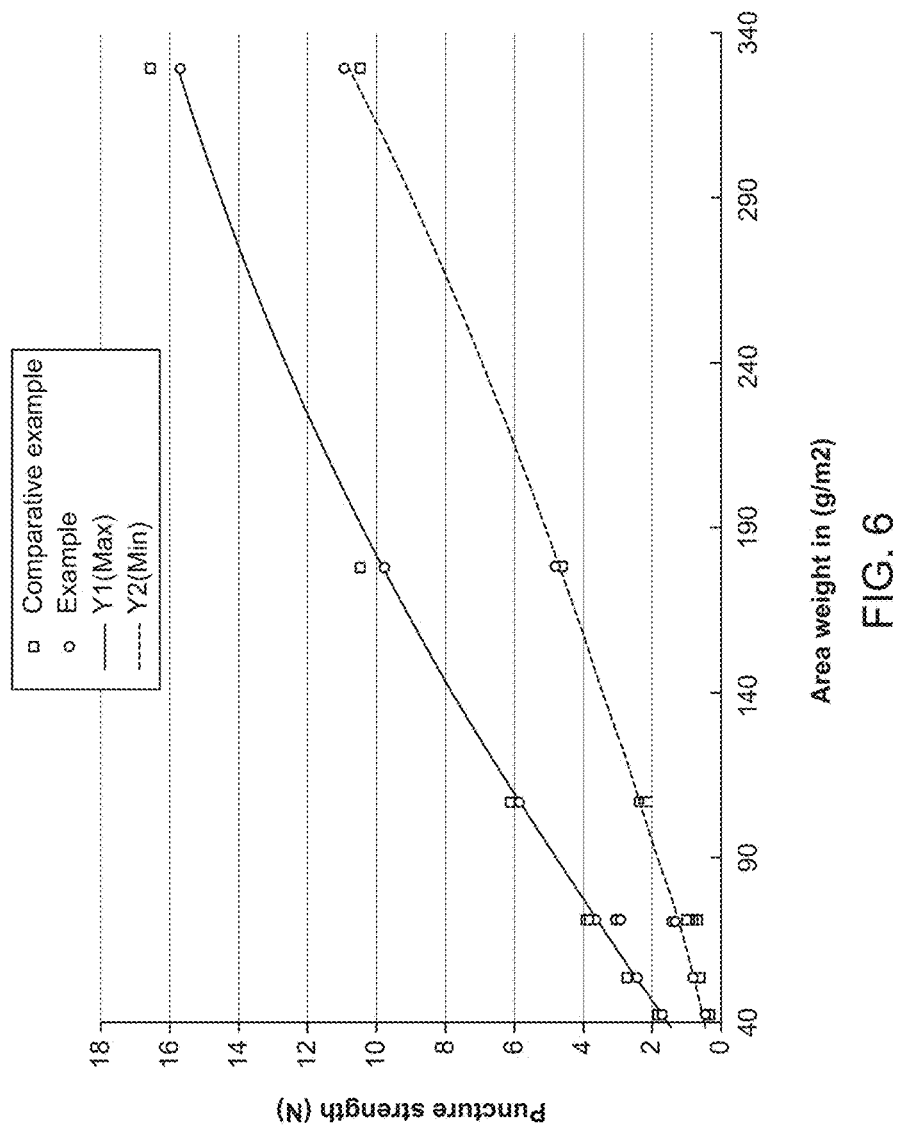

The area weight value (X axis) and puncture strength value of the electrodeposited copper foil (Y axis) at this time were subjected to polynomial regression analysis (in FIG. 6), and the present inventors have found that acceptable electrodeposited copper foils must have an area weight of the electrodeposited copper foil in the range of 26.7-329.4 g/m$^2$, and a puncture strength of the electrodeposited copper foil between Y1 (N) [Maximum], and Y2 (N) [Minimum].

The value for Y1 is calculated by the following formula 1:

$$Y1=-0.00007*X^2+0.075*X-1.3373, \text{ wherein } X=\text{the area weight of the copper foil (g/m}^2\text{), which is calculated by weight basis.} \quad \text{Formula 1:}$$

The value Y2 is calculated by the following formula 2:

$$Y2=0.00003*X^2+0.0247*X-0.6454, \quad \text{Formula 2:}$$

wherein X in each of formulas 1 and 2 represents the area weight of the electrodeposited copper foil in g/m$^2$, and Y in each of formulas 1 and 2 represents the puncture strength of the electrodeposited copper foil in N.

In making the copper foil by electrodepositing a copper foil from a copper-containing electrolyte solution, the electrolyte solution comprises nickel in the amount in the range of 200-500 ppm.

It is furthermore important that the electrodeposited copper foil contains less than 5 voids in an area of 1 μm$^2$ of the copper foil, wherein the voids are defined as each having a diameter of 0.01 μm or more.

In order to obtain an electrodeposited copper foil suitable for use as a current collector in a rechargeable secondary battery having a cycle life in excess of 900 charge/discharge cycles, the grains constituting the internal layer are preferable to be not only fine but also uniform. It is important that the grain size difference between the drum side and the deposit side of the copper foil be in the range of 0.05-0.55 μm. The uniform grains make a load applied on the foil disperse without concentration on specific grains and contribute to the strength enhancement. Note that, the grain size can be an average value of grain sizes determined from the grain diameters of grains present in a prescribed measurement visual field.

The disclosure of specific, including preferred embodiments, is intended to be exemplary of the embodiments described herein, but should not be construed as limiting the disclosure, parameters, process or method steps, copper foils, current collectors, batteries or other products incorporating the same.

It is to be further understood that one skilled in the art, upon reading the present disclosure, could envision modifications thereof, including equivalents of the parameters, steps and copper foils described herein, without the exercise of inventive effort and without departing from the spirit and scope of the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

We claim:

1. An electrodeposited copper foil having an area weight of the electrodeposited copper foil is in the range of 26.7-329.4 g/m$^2$, and a puncture strength, Y, the puncture strength Y of the electrodeposited copper foil must lie in a range defined between a maximum value, Y1 (in N), and a minimum value, Y2 (in N), wherein the value Y1 is calculated by the following formula 1:

$$Y1=-0.00007*X^2+0.075*X-1.3373 \quad \text{formula 1:}$$

and the value Y2 is calculated by the following formula 2:

$$Y2=0.00003*X^2+0.0247*X-0.6454 \quad \text{formula 2:}$$

wherein X in each of formulas 1 and 2 represents the area weight of the electrodeposited copper foil (g/m$^2$), and Y represents the puncture strength of the electrodeposited copper foil (in N).

2. The electrodeposited copper foil of claim 1, wherein the copper foil has a deposit side and the surface roughness (Rz) of the deposit side is in the range of 0.4-2.0 μm.

3. The electrodeposited copper foil of claim 2, wherein the number of voids per μm$^2$ is less than 5.

4. A rechargeable secondary battery comprising the electrodeposited copper foil of claim 1.

5. The rechargeable secondary battery of claim 4, wherein the battery is a lithium containing battery.

6. An electrodeposited copper foil having an area weight of the electrodeposited copper foil is in the range of 26.7-329.4 g/m$^2$, and a puncture strength Y, the puncture strength of the electrodeposited copper foil is between a maximum value, Y1 (N), and a minimum value, Y2 (N), wherein the value Y1 is calculated by the following formula 1:

$$Y1=-0.00007*X^2+0.075*X-1.3373 \quad \text{formula 1:}$$

and the value Y2 is calculated by the following formula 2:

$$Y2=0.00003*X^2+0.0247*X-0.6454 \quad \text{formula 2:}$$

wherein X in each of formulas 1 and 2 represents the area weight of the electrodeposited copper foil (g/m$^2$), and Y represents the puncture strength of the electrodeposited copper foil (N), wherein the copper foil has a drum side and a deposit side, each of said drum side and said deposit side comprising grains having a grain size, wherein the grain size difference between the drum side and the deposit side is in the range of 0.05-0.55 μm.

* * * * *